Patented Aug. 31, 1948

2,448,320

UNITED STATES PATENT OFFICE 2,448,320

SHELLAC BLEACHING

William J. McIntosh, Rahway, N. J., assignor to Mathieson Chemical Corporation, a corporation of Virginia No Drawing. Application June 15, 1945,
Serial No. 599,757

9 Claims. (Cl. 106—236)

My present invention relates to improvements in the bleaching of shellac. The invention is applicable generally to seed lacs and orange shellacs. The advantages of my invention include improved economy and reduced degradation of the shellac.

In my copending application, Serial No. 546,068, filed July 21, 1944, now abandoned, of which the present application is in part a continuation, I have described a method of bleaching shellac comprising dissolving the shellac in an organic solvent, for instance, 95% ethyl alcohol, and admixing therewith an aqueous solution of sodium chlorite.

I have now found that in order to effect the bleaching at a commercially attractive rate, it is usually desirable that the chlorite be activated by the presence of an aldehyde.

Ordinary commercial solvent grade alcohols, such as methyl and ethyl alcohols, and particularly 95% ethyl alcohol, specifically disclosed in the above noted application, contain a sufficient quantity of aldehyde, as impurities or denaturants, to activate the chlorite. Where an aldehyde-free solvent is employed, it is desirable to add a small amount of aldehyde as such, to the solvent.

In carrying out my invention, I may dissolve the shellac in an organic shellac solvent miscible with water and containing a small amount of aldehyde, and subject the resultant solution to the action of an aqueous solution of sodium chlorite. The shellac is with advantage dissolved in the shellac solvent, the sodium chlorite dissolved in water, preferably a relatively small amount of water, and the sodium chlorite solution then admixed with the shellac solution. Also, it is advantageous to add some of the shellac solvent to the aqueous solution of sodium chlorite before the latter is added to the shellac solution, so that the sodium chlorite is added to the shellac solution in solution in a mixture of water and the water-miscible shellac solvent. When this latter procedure is employed, the solution of chlorite, water and the solvent should be kept cool and added to the shellac solution with a minimum of delay after mixing, particularly where the organic solvent added to the chlorite solution is a primary alcohol containing an aldehyde. This expedient is desirable so as to avoid excessive oxidation of the alcohol or too rapid reaction.

During the bleaching reaction, the shellac solution is with advantage maintained at a temperature not exceeding 80° F. The reaction being mildly exothermic, the reaction mixture is usually cooled as the reaction proceeds. In the absence of aldehyde it is sometimes desirable to initiate the reaction by using a somewhat higher initial temperature so as to shorten the induction period, hereinafter described. Control of the temperature is also facilitated by adding the sodium chlorite solution to the shellac solution at a moderate rate or in successive small increments. When the reaction is complete, i. e., when the sodium chlorite is exhausted, an antichlor, such as aqueous hydrogen peroxide, sodium hydrosulfite, oxalic acid or the like, is with advantage added to the shellac solution to eliminate chlorine or compounds containing available chlorine. The use of hydrogen peroxide for this purpose is particularly advantageous.

While the precise order in which the shellac, shellac solvent, aldehyde, water and sodium chlorite are brought together, is not essential in a broad aspect of my invention, I have found the specific procedure described to be particularly advantageous.

The amounts of water used may with advantage be so limited that the water content of the bleached shellac solution, after dilution with the shellac solvent to yield a product of proper concentration, does not exceed about 5%–6% by volume. This much water in the shellac product is within the range of water content ordinarily encountered in commercial shellac cuts and does not impair the quality of the product. After the bleached shellac solution has been brought to the proper concentration, by appropriate dilution with the shellac solvent, I prefer to centrifuge the product to separate any insoluble impurities.

An advantage of my improved process is that in accordance therewith the necessity of drying the product to remove excess water is avoided. Also, in carrying out the process, it is particularly desirable to use as the shellac solvent, a solvent, such as alcohol, of the type to be used as the diluent in the final shellac product. By using such a solvent in the bleaching operation, the necessity of removing it from the shellac, prior to cutting the bleached shellac to the desired concentration of the finished product, is avoided.

It has previously been proposed to bleach shellac by treatment with a hypochlorite in aqueous solution prepared, for instance, by dissolving the shellac in an aqueous soda ash or other alkali solution. Such proposal has been subject to several disadvantages. In the first place, it has been necessary to use relatively large proportions of water and, subsequent to the bleaching, it has been necessary to precipitate the shellac, as by adding a mineral acid to the aqueous shellac solution, and thereafter to wash and dry the shellac. An even more serious difficulty encountered in bleaching shellac with a hypochlorite is that the characteristics of the shellac are detrimentally affected by the hypochlorite. Shellac so treated has been found to have deteriorated, to contain considerable amounts of chemically bound chlorine, to have a tendency to deteriorate further in storage, and to have a substantially reduced "life."

In using a hypochlorite, it has not been feasible to bleach shellac in solution in organic solvents, such, for instance, as alcohol or acetone, because of the very unstable nature of hypochlorites in such solution, the hypochlorite tending to react with alcohols to form chlorals and with acetone to form chloroform. Further, in order to get the shellac into aqueous solution, it has been necessary to neutralize the normal acidity of the shellac and subsequently to reacidify the solution to precipitate the shellac.

My present bleaching process is free from these difficulties. It affords marked economy by avoiding the necessity of neutralizing, coagulating and drying the shellac subsequent to bleaching, this by reason of the fact that it becomes unnecessary to neutralize the shellac in order to dissolve it and that the bleaching may thereby be effected in substantially non-aqueous solution, only sufficient water being required to dissolve the chlorite. Aside from convenience and economy, shellac bleached by my improved process has been found to be substantially free from combined chlorine, to have materially improved life, as compared with that of shellac bleached in alkaline aqueous solution by treatment with a hypochlorite, as determined by conventional methods, and to have suffered no material degradation by reason of the bleaching.

Where the process of my invention is initiated in the absence of aldehyde, there is a substantial induction period before the bleaching action of the chlorite proceeds at a satisfactory rate. Where an aldehyde is present in the shellac solvent or is otherwise introduced into the reacting mixture at the time of mixing, this induction period is substantially eliminated. The amount of aldehyde required to activate the chlorite is very small. A mere trace sufficient to give a positive Schiff test, has been found effective.

The process is useful, though usually less attractive where time is an important consideration, even where no aldehyde is initially present in the reacting mixture, particularly where the shellac solvent used is a water-soluble primary alcohol, for instance methyl or ethyl alcohol, and the alkalinity of the chlorite solution is insufficient substantially to neutralize the acidity of the shellac. Acetone, for instance, may with advantage be used as the shellac solvent, particularly where an aldehyde is present, but in the absence of an aldehyde in the initial mixture it is usually preferable to use a water-soluble primary alcohol as the shellac solvent. Where the rate of the bleaching reaction is of minor importance, other water soluble organic solvents of shellac may be used, even in the absence of an aldehyde, particularly where the alkalinity of the chlorite solution is insufficient substantially to neutralize the acidity of the shellac.

I do not intend to be bound by any theory as to this induction period, or the means by which the chlorite is finally activated where no aldehyde is added, as such to the reacting solution. However, such information as is available seems to indicate that the normal acidity of the shellac is sufficient to decompose a small portion of the chlorite with the generation of chlorine dioxide, which in turn oxidizes some of the alcohol to form aldehydes. The chlorite is then activated by the aldehydes thus formed and the bleaching reaction proceeds rapidly.

The duration of the induction period where no aldehyde is added, as such, appears to depend upon the acidity of the shellac, and also upon the amount of alkali introduced into the solution as impurities in the chlorite. In general, where a commercial grade of the chlorite is dissolved in a solvent, such as an aqueous alcohol solution, the pH of the solution will normally not exceed about 10. The pH of the composite solution containing the shellac will be substantially lowered by the acidity of ordinary shellac and will generally result in an acid pH and a sufficient activation of the chlorite to effect a material bleaching of the shellac following the induction period.

The acidity of shellac has been found to vary somewhat, but, in general, it acts as a weak organic acid and the normal acidity of ordinary shellac will generally result in the activation of a commercial grade of the chlorite. In operations of the types specifically described herein, the pH of the composite solution, resulting from the admixing of the shellac solution with the chlorite solution, has been found to be acidic, say about 5 or below. It is possible that the activation of the chlorite may, in part, be due directly to the acidity of the composite solution.

Aldehydes present in shellac solvents of the type described usually consist largely of formaldehyde. While formaldehyde has been found highly effective for purposes of my present invention, other aldehydes are also effective, including aliphatic aldehydes, aromatic aldehydes, other carbocyclic aldehydes and heterocyclic aldehydes, for example, acetaldehyde, paraformaldehyde, furfural, benzaldehyde, and the like.

The proportion of chlorite to be used will depend upon the nature of the shellac and the extent of bleaching required. Generally, a proportion within the range of about 3½ to 6½ lbs. of available chlorine as chlorite per 100 lbs. of shellac may be used with advantage.

The following example will illustrate the application of my invention: 4800 lbs. of orange shellac was dissolved in 800 gallons of aqueous ethyl alcohol. 95% by volume ethyl alcohol denatured by the addition of 5 gallons of methanol per 100 gallons of ethyl alcohol, and containing aldehydes, particularly formaldehyde. 225 lbs. of technical sodium chlorite was dissolved in 45 gallons of water and, after solution was complete, 70 gallons of the same alcohol mixture was added to the sodium chlorite solution, the resultant mixture being kept cool. To the shellac solution, in a tank equipped with a stirrer and with cooling coils, the sodium chlorite solution was slowly added with agitation, over a period of about 6–8 hours, while the temperature was maintained at about 75–80° F. Exhaustion of the sodium chlorite was checked by the conventional starch-potassium iodide test for available chlorine. 15 gallons of 100 volume hydrogen peroxide was then thoroughly mixed with the bleached shellac solution. Sufficient of the same alcohol mixture was then added to the bleached shellac solution to bring the total value to 1500 gallons and this diluted solution was centrifuged to separate all insoluble impurities. The product was a 5 lb. cut shellac varnish of good color and stability and in other respects of quality equal to that of the unbleached orange shellac.

I claim:

1. In the bleaching of shellac, the improvement which comprises dissolving the shellac in an organic shellac solvent miscible with water and admixing the shellac solution with an aqueous solution of sodium chlorite.

2. In the bleaching of shellac, the improvement which comprises dissolving the shellac in an organic shellac solvent miscible with water and admixing with the shellac solution a solution of sodium chlorite in a mixture of water and the water-miscible organic shellac solvent.

3. In the bleaching of shellac, the improvement which comprises mixing the shellac, in solution in an organic shellac solvent miscible with water, with an aqueous solution of sodium chlorite in the presence of a small amount of an aldehyde sufficient to activate the chlorite.

4. In the bleaching of shellac, the improvement which comprises dissolving the shellac in an organic shellac solvent miscible with water and containing an aldehyde, and admixing with the shellac solution a solution of sodium chlorite in a mixture of water and a water-miscible organic shellac solvent.

5. In the bleaching of shellac, the improvement which comprises dissolving the shellac in an organic shellac solvent miscible with water, mixing the shellac solution with an aqueous solution of sodium chlorite in the presence of a small amount of an aldehyde, sufficient to activate the chlorite and thereafter adding a sufficient quantity of an anti-chlor to remove available chlorine therefrom.

6. In the bleaching of shellac, the improvement which comprises dissolving the shellac in an organic shellac solvent miscible with water, treating the shellac solution with an aqueous solution of sodium chlorite in the presence of a small amount of an aldehyde sufficient to activate the chlorite, and thereafter adding an aqueous solution of hydrogen peroxide in amount sufficient to remove available chlorine from the mixture.

7. In the bleaching of shellac, the improvement which comprises dissolving the shellac in an organic shellac solvent miscible with water, mixing the shellac solution with an aqueous solution of sodium chlorite in the presence of a small amount of an aldehyde sufficient to activate the chlorite while maintaining a temperature not exceeding about 80° F. until the sodium chlorite solution is exhausted.

8. In the bleaching of shellac, the improvement which comprises mixing together the shellac, an organic shellac solvent miscible with water, an aldehyde, water and sodium chlorite.

9. In the bleaching of shellac, the improvement which comprises dissolving the shellac in a water soluble primary alcohol and admixing the shellac solvent with an aqueous solution of sodium chlorite of insufficient alkalinity substantially to neutralize the acidity of the shellac.

WILLIAM J. McINTOSH.

REFERENCES CITED

The following references are of record in the file of this patent:

UNITED STATES PATENTS

| Number | Name | Date |
| --- | --- | --- |
| 504,064 | Field | Aug. 29, 1893 |
| 2,100,496 | Taylor | Nov. 30, 1937 |
| 2,260,367 | Dubean | Oct. 28, 1941 |
| 2,397,389 | Vincent | Mar. 26, 1946 |

OTHER REFERENCES

Suter, Oil and Colour Trades Journal, Nov. 20, 1936, pages 1502–1505. Murtz, Abstracts on Shellac Research Literature, Feb. 1935, page 9. Gidvani, Chemical Abstracts, vol. 32, 1938, page 9527.